United States Patent [19]
Li et al.

[11] Patent Number: 5,552,884
[45] Date of Patent: Sep. 3, 1996

[54] CALIBRATION STANDARD FOR FLYING HEIGHT TESTER HAVING A HEAD MOUNTED ON A MULTILEVEL SURFACE TRANSPARENT DISC

[75] Inventors: Yufeng Li, Eden Prairie; Peter R. Goglia, Edina, both of Minn.

[73] Assignee: Seagate Technology, Inc., Scotts Valley, Calif.

[21] Appl. No.: 358,204

[22] Filed: Dec. 16, 1994

[51] Int. Cl.$^6$ .................................................. G01J 1/02
[52] U.S. Cl. ........................................ 356/243; 356/357
[58] Field of Search ................................ 356/243, 355, 356/357–358

[56] References Cited

U.S. PATENT DOCUMENTS

| | | | |
|---|---|---|---|
| 4,346,996 | 8/1982 | Miller | 356/243 |
| 4,624,564 | 11/1986 | Dahlgren | 356/243 |
| 4,988,194 | 1/1991 | Hara et al. | 356/243 |
| 5,220,408 | 6/1993 | Mager | 356/372 |
| 5,410,402 | 4/1995 | Li et al. | 356/243 |

FOREIGN PATENT DOCUMENTS

| | | | |
|---|---|---|---|
| 01-013408 | 1/1989 | Japan | 356/243 |
| 4050605 | 2/1992 | Japan | 356/243 |

OTHER PUBLICATIONS

Fumitaka Muranushi, Katsuyuki Tanaka, Yoshinori Takeuchi, *Estimation of the Zero–Spacing Error Due to a Phase Shift of Reflected Light in Measuring a Magnetic Head Slider's Flying Height by Light Interference*, Adv. Info. Storage Syst., vol. 4, 1992 American Society of Mechanical Engineers.

*Primary Examiner*—Frank Gonzalez
*Assistant Examiner*—Jason D. Eisenberg
*Attorney, Agent, or Firm*—Kinney & Lange, P.A.

[57] ABSTRACT

The present invention provides a calibration standard for the uniform calibration of flying height testers. The calibration standard comprises a head assembly held in contact with a transparent disc through the use of a load spring. The transparent disc has a plurality of grooves formed in a surface facing the head assembly. A cover case is attached to the glass disc at one end and provides a sealed environment for the interface between the head assembly and the transparent disc.

22 Claims, 3 Drawing Sheets

CALIBRATION STANDARD FOR FLYING HEIGHT TESTER HAVING A HEAD MOUNTED ON A MULTILEVEL SURFACE TRANSPARENT DISC

BACKGROUND OF THE INVENTION

The present invention relates to testing the flying height of a head assembly including a read/write head mounted on a slider used in a computer disc drive. In particular, the present invention is a calibration standard and a method of calibrating a flying height tester.

In the disc recording art, it is common to use a read/write head mounted on a slider which reacts against the air moved with the rotating disc, causing the slider and head to "fly" a small distance from the disc surface. In the manufacture of such head assemblies, it is common to test the hydrodynamic characteristics of the assembly so that the flying height characteristics are known, thereby avoiding the use of heads which fly too high or too low in relationship to disc surface and also avoiding heads which fly at an improper angle to the disc. Too high a flying height will result in lower areal density, while too low a flying height can cause head/disc interface failure.

Flying height testing is generally accomplished by means of a flying height tester, using optical interference techniques. Such a flying height tester comprises, for example, a light source directing light at a glass disc. The glass disc is rotated at speeds simulating the rotation of a magnetic disc, and the head assembly being tested is positioned in a holder in flying relation to the glass disc. Light is directed at the disc at a predetermined angle to the surface thereof. Light is reflected from the surface of the disc closest to the flying head, as well as from the surface of the flying head assembly itself, and impinges onto a light sensor.

The flying height between the head and the disc can be determined by the intensity of the light received by the light sensor, or by the constructive or destructive wavelength of the light received by the light sensor. A computer is programmed to receive data from the flying height tester and calculates the perceived flying height and angle of the head. With the rapid advance of disc drive technology, the flying height of many modern disc drives is less than 0.1 microns. Therefore, the accuracy of the flying height tester, and therefore its calibration, is an important concern.

Calibration of flying height testers has been accomplished through the use of a standard head assembly whose characteristics are known. However, after repeated use, the reflective surface and flying characteristics of the standard head assembly can be altered by dust and other foreign matter, altering the calibration of the flying height tester. Calibration of flying height testers can also be accomplished through the use of a variety of calibration standards which are placed in the flying height tester.

One such standard used to calibrate a flying height tester comprises a substrate having a reflective layer deposited thereon to represent the head assembly and a transparent layer having a predetermined thickness deposited on the reflective layer. A disadvantage of such a calibration standard is that it uses a transparent material rather than air between the disc and the reflective layer.

SUMMARY OF THE INVENTION

The present invention provides a calibration standard for the uniform calibration of flying height testers. The calibration standard comprises a generally flat head assembly, a transparent disc, a cover case and a load spring. The transparent disc has a plurality of grooves and a plurality of ridges formed in a surface facing the head assembly. The head assembly is held in contact with the ridges through the use of the load spring. A first end of the cover case is attached to the glass disc and the cover case provides a backing for the load spring as well as a sealed environment for the interface between the head assembly and the transparent disc.

To calibrate a flying height tester, the calibration standard of the present invention is placed in the tester. The depth of one of the grooves in the disc is physically measured to obtain an expected value of the groove depth. Optical measurements are theta taken to determine the distance between the head assembly and the facing surface of one of the ridges in the transparent disc as well as the distance between the head assembly and a bottom surface of an adjacent groove. These two measurements are used to calculate a measured value of the groove depth. The difference between the measured value of the groove depth and the expected value of the groove depth is then used to calibrate the flying height tester.

DETAILED DESCRIPTION OF THE PREFERRED EMBODIMENTS

To calibrate a flying height tester by the method of the present invention, a calibration standard is placed in the flying height tester such that the optical apparatus of the flying height tester can take a measurement of the calibration standard. The value obtained from the optical measurement is then compared to a known or expected value. The difference between the expected value of the measurement and the value obtained through the measurement itself is used to calibrate the flying height tester for subsequent measurements of the flying height of head assemblies. To further describe the method of the present invention, it is first necessary to describe the operation of a typical flying height tester.

Figure 1:
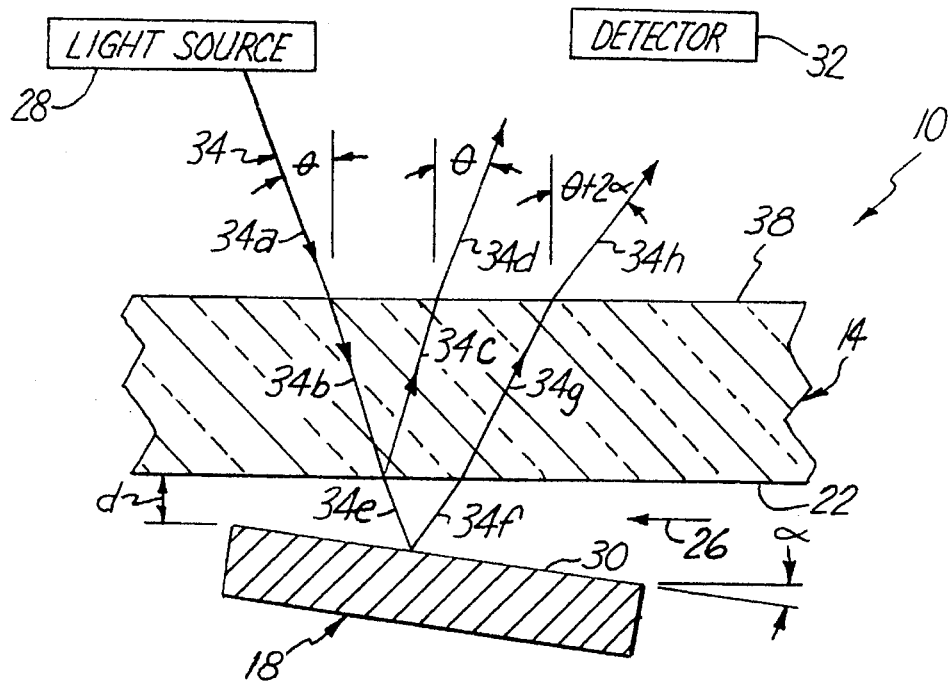
FIG. 1 is a schematic cross-sectional view of a portion of a standard flying height tester for measuring the flying height characteristics of a head assembly, such a flying height tester being part of the prior art.

FIG. 1 shows a portion of a flying height tester 10 which is used to test flying height characteristics for magnetic head assemblies. A transparent disc 14 is rotated about its axis so that a head assembly 18 comprising a slider holding a magnetic head "flies" a distance from a first surface 22 of the disc 14 due to air flow in the direction of arrow 26 caused by the rotation of the disc 14. A monochromatic light beam from a light source 28 is directed along a path through the disc 14 and is reflected off the first surface 22 of the disc 14 and a surface 30 of the head assembly 18 toward a light sensor or detector 32.

Specifically, the monochromatic light follows path 34a toward a second surface 38 of the disc 14, impinges the disc 14 at an incident angle θ to the second surface 38, and follows path 34b through the disc 14. The light is split and partially reflected off the first surface 22 to follow path 34c through the disc 14 and thereupon path 34d to the sensor 32. The other portion of the split light follows path 34e to reflect off the surface 30 of the head assembly 18 and follows path 34f to the first surface 22 of the disc 14, path 34g through the disc 14 and path 34h to the sensor 32. The slight angular deviations at the interface between air and disc are caused by the Snell effect. It should be noted that paths 34a and 34d are each oriented at an angle θ from the vertical and that path 34h is not parallel to path 34d but is at an angle θ+2α to the vertical, where angle α is the angle of orientation of the head assembly 18 with respect to the first surface 22 of the disc 14.

Path 34a represents only one of numerous parallel rays of light used in the tester. The sensor 32, therefore, will receive light from the paths 34d and 34h corresponding to each of the numerous paths 34a. As a result, the light received by the sensor 32 will include, at any given location, light from a path 34d from one ray and light from a path 34h from another ray. The distance d between the head assembly 18 and the first surface 22 of the disc 14 can be determined by measuring the intensity of the light impinging on the sensor 32. The angle α can be determined by finding the distance d at a plurality of points.

Figure 2:
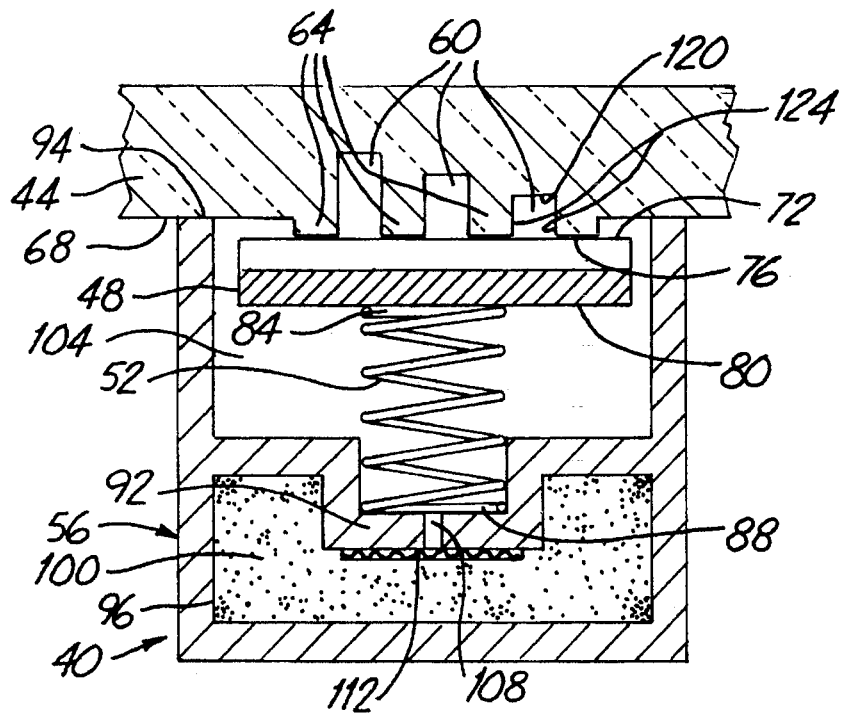
FIG. 2 is a schematic cross-sectional view of a calibration standard of the present invention.

A calibration standard 40 of the present invention is shown in FIG. 2 and comprises a glass disc 44, a head assembly 48 including a slider on which is mounted a magnetic head, a load spring 52 and a cover case 56. A plurality of generally parallel grooves 60 and a plurality of generally parallel ridges 64 are formed in a first side 68 of the glass disc 44, only a part of which is shown in FIG. 2. The head assembly 48 includes a pair of rails 70, each of which has a first surface 72 which contacts a top surface 76 of each of the ridges 64. A second surface 80 of the head assembly 48 is located opposite the first surface 72 of the rails 70. A first end 84 of the load spring 52 contacts the second surface 80 of the head assembly 48 while a second end 88 of the load spring 52 contacts an inner dividing wall 92 of the cover case 56. The load spring 52 provides sufficient pressure to firmly hold the head assembly 48 in place against the glass disc 44 without causing significant deformation of the head assembly 48 or the disc 44.

The cover case 56 has an end surface 94 which contacts the first side 68 of the glass disc 44 and is held in place on the glass disc 44 through the use of an adhesive. The cover case 56 includes a desiccant chamber 96 in which is located a desiccant 100. Together with the glass disc 44, the cover case 56 forms a head chamber 104 in which is located the load spring 52 and the head assembly 48. The inner dividing wall 92 of the cover case 56 separates the desiccant and head chambers 96 and 104 and has an opening 108 therethrough, permitting air flow between the two chambers. An air permeable membrane 112 covers the opening 108 to retain the desiccant 100 in the desiccant chamber 96. In addition to providing a backing for the load spring 52, the cover case 56 provides a sealed environment for the head assembly 48, thereby reducing measurement errors that may occur through the buildup of dust and other particulate contaminants.

The desiccant 100 absorbs water molecules and other liquid contamination in the head chamber 104 which may exist before the cover case 56 is mounted onto the glass disc 44. The desiccant 100 can absorb a sufficient amount of liquid to prevent liquid contamination of the head chamber 104 for an extended period of time. The head assembly 48 is generally fabricated from the same material as that from which the head assemblies whose flying heights are to be measured are fabricated. This eliminates any inaccuracies that might occur were a different material, having different properties, to be used for the head assembly 48.

Figure 3:
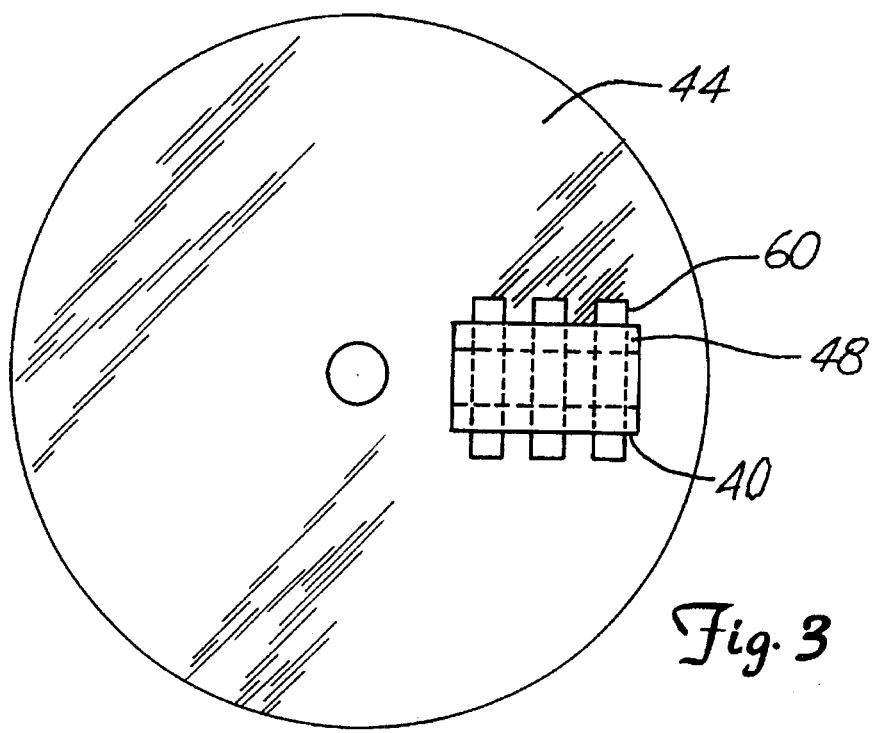
FIG. 3 is a schematic top view of a portion of a calibration standard of the present invention.

Each groove 60 has a bottom surface 120 and two side surfaces 124. The grooves 60 in the glass disc 44 are generally parallel to each other as shown in FIG. 3, which shows a top view of a portion of the calibration standard 40. Each groove 60 generally has a width between 50 and 500 micrometers and a length greater than the width of the head assembly 48, which is generally between 3000 and 5000 micrometers. Generally, the depths of the grooves 60 are between two nanometers and one hundred nanometers and are made to have a depth corresponding to the flying heights of the head assemblies that are to be tested on the flying height tester.

While a calibration standard 40 having three grooves 60 is shown, a standard having only one groove can be used to calibrate a flying height tester and the maximum number of grooves that a standard can have is limited only by the dimensions of the glass disc and head assembly used. The grooves 60 are formed through a process generally well known in the art such as ion milling or chemical etching. By forming a number of grooves 60 in the glass disc 44, each of which has a different depth, a single calibration standard 40 can be used to calibrate a flying height tester on which a wide range of flying heights are to be tested.

Figure 4:
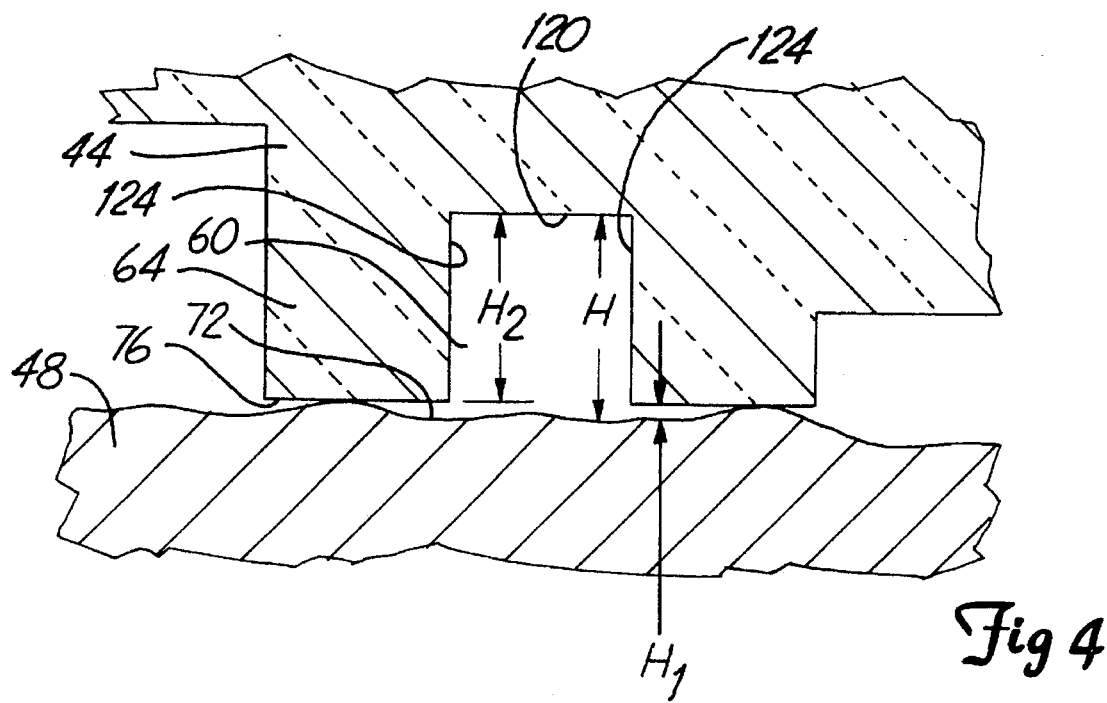
FIG. 4 is a schematic cross-sectional view of a portion of a calibration standard of the present invention.

The depth H of each groove 60 is the distance between the top surface 76 of one of the ridges 64 adjacent the groove 60 and the bottom surface 120 of the groove 60, as shown in FIG. 4. Each groove 60 of the calibration standard 40 will have a different value for its depth H. To calibrate a flying height tester using the calibration standard 40 of the present invention, an optically measured depth $H_m$ of at least one of the grooves 60 in the glass disc 44 is compared with a physically measured or expected value of the depth $H_e$ of the groove 60. Because the top surface 76 of each ridge 64 is coplanar with the top surfaces 76 of the other ridges 64 and the bottom surface 120 of each groove 60 is generally flat, the depth It does not vary substantially along the width of each groove 60. The expected depth $H_e$ of each groove 60 in the glass disc 44 is determined by a known method such as through the use of a stylus profilometer.

To optically measure the depth H of the grooves 60, the calibration standard 40 is positioned in the flying height tester 10 adjacent the light source 28 of the tester 10. To do this, the transparent disc 14 of the flying height tester 10 is removed and the glass disc 44 along with the rest of the calibration standard 40 is inserted. Generally, the calibration standard 40 is mounted with the glass disc 44 facing upward and is not rotated during the calibration of the flying height tester 10.

Once the calibration standard 40 is in place, the depth H of one of the grooves 60 is measured by making two optical measurements near one of the side surfaces 124 of the groove 60 as shown in FIG. 4. The first measurement is used to determine a distance $H_1$ between the first surface 72 of the head assembly 48 and the top surface 76 of one of the ridges 64 adjacent the groove 60 while the second measurement is used to determine a distance $H_2$ between the first surface 72 of the head assembly 48 and the bottom surface 120 of the groove 60. The measured value for $H_1$ is subtracted from the measured value for $H_2$ to obtain a measured depth $H_m$. The measured depth $H_m$ of the groove 60 can theta be compared to the expected depth $H_e$ of the groove 60 to calibrate the flying height tester.

Figure 5:
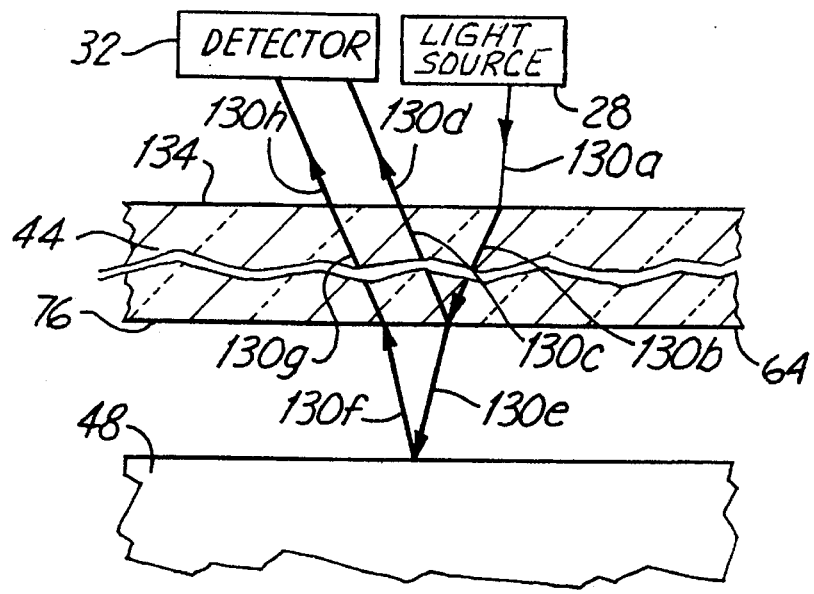
FIG. 5 is a schematic cross-sectional view of a portion of a calibration standard of the present invention.

To optically measure $H_1$ and $H_2$, monochromatic light is directed at the glass disc 44 from the light source 28. The measurement of $H_1$ is shown in FIG. 5, which shows an enlarged portion of one of the ridges 64. To measure $H_1$, the monochromatic light is directed toward the disc 44 along path 130a and impinges the glass disc 44 at an angle normal to an outer surface 134 of the disc 44. The light continues through the disc 44 along path 130b to the top surface 76 of the ridge 64, where it is divided and partially reflected. The reflected portion follows path 130c through the disc 44 to the outer surface 134, and then follows path 130d to the flying height tester light sensor 32. The remaining light follows path 130e to the first surface 72 of the head assembly 48 where it is reflected and directed at the glass disc 44 via path 130f. The light impinges the glass disc 44 at its upper surface 76, follows path 130g through the disc 44, and then follows path 130h to the light sensor 32. The slight angular deviations between paths at the interface between the glass disc 44 and the air are due to the Snell effect. Because the effects of the Snell effect are self-cancelling, light path 130e is parallel to light path 130a and path 130h is parallel to path 130f. The incident light from the light source 28 is perpendicular to the plane of the outer surface 134 of the glass disc 44. The angle of incidence has been exaggerated in FIG. 5 for illustrative purposes only. The distance $H_2$ is measured in a similar fashion.

Assuming normal incidence to the glass disc 44, the total intensity I of the light shining on the light sensitive sensor is given by the equation:

$$I = I_1 + I_2 + 2\sqrt{I_1 + I_2} \; \sin\left(4\frac{\pi}{\lambda} H + \phi\right)$$

where $I_1$ represents the intensity of the light impinging on the sensor 32 from the path 130d of one beam of light, while $I_2$ represents the intensity of the light impinging on the sensor 32 from the path 130h of a second beam of light. This equation represents the relationship between the depth H of the groove 60 and the intensity I of the light impinging on the sensor 32.

Both $I_1$ and $I_2$ are constants and are defined in terms of $I_{max}$ and $I_{min}$ by the equations:

$$I_{max} = I_1 + I_2 + 2\sqrt{I_1 I_2}$$

$$I_{min} = I_1 + I_2 - 2\sqrt{I_1 I_2}$$

where $I_{max}$ and $I_{min}$ are constants whose values are determined through a process known as light intensity calibration which is described below. The value of $\phi$ from the first equation is also a constant and is determined by the equation:

$$\phi = \tan^{-1}\left(\frac{2k}{1 - n^2 - k^2}\right)$$

where n and k represent the index of refraction and coefficient of extinction, respectively, of the material used to fabricate the slider of the head assembly 48.

Once the values of $I_1$, $I_2$, and $\phi$ are determined, the first equation can be used to determine the measured depth $H_m$ of the groove 60 from the measurements of the intensity I of the light impinging on the sensor 32. The above equations for I, $I_{max}$ and $I_{min}$ are used for a single reflection from the head assembly 48. For situations involving multiple reflections, the principle and procedure remains the same, but the equations must be slightly modified to account for the multiple reflections.

Figure 6:
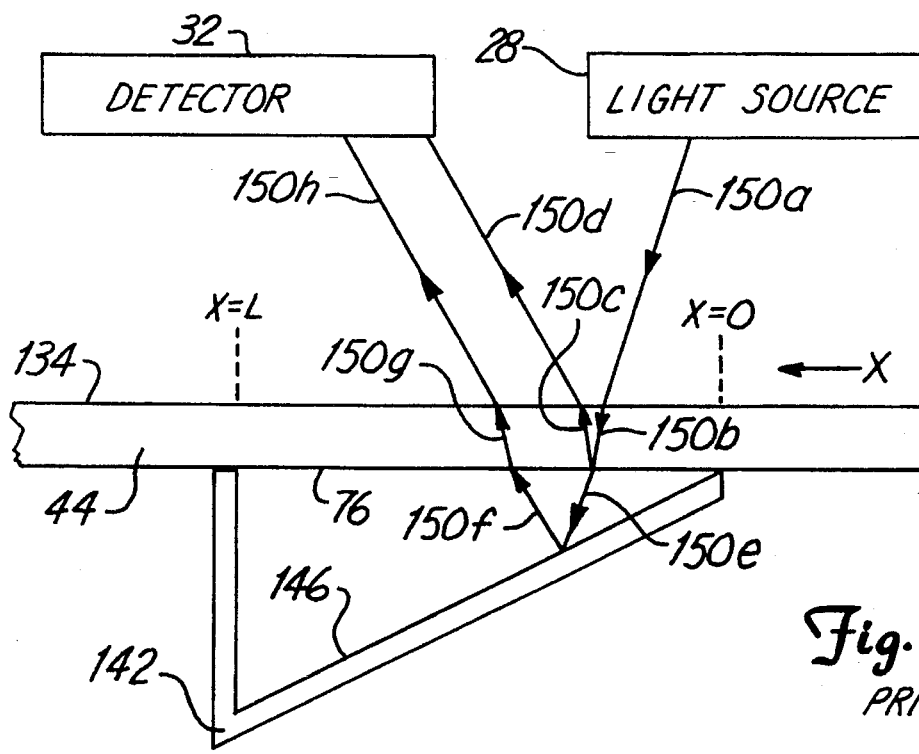
FIG. 6 is a schematic cross-sectional view of an apparatus used in the performance of light intensity calibration in the present invention.

A key step in the optical measurement process is the process of light intensity calibration which is used to determine the values of $I_{max \; and \; Imin}$. Referring to FIG. 6, the process of light intensity calibration is performed as follows. A slider 142 having the general shape of a wedge and fabricated from the same material as the slider in the head assembly 48 is placed in contact with a portion of the glass disc 44 without any grooves such that a first surface 146 of the slider 142 is at an angle to the disc 44. The light source 28 is moved along an x-axis so that light is reflected off of each point along the first surface 146 of the slider 142. At each point along the x-axis, the light from the light source 128 follows a series of paths 150a–150h similar to paths 130a–130h described above for the measurement of $H_1$ and $H_2$. The additive and subtractive nature of the reflected light along paths 150d and 150h creates a continuous spectrum containing segments of high intensity light as well as darker segments for the light sensor 32. From this continuous spectrum can be found values for both the maximum intensity $I_{max}$ and the minimum intensity $I_{min}$ of the light on the sensor 32. The light intensity calibration process can also be performed by placing the head assembly 48 in a wide groove formed in the disc 44 in a position that causes the first surface 72 of the head assembly 48 to be at an angle to the disc 44.

The first surface 72 of the head assembly 48 generally has a number of small, irregular surface flaws caused by imperfections in the fabrication process. These flaws can cause a small amount of separation between the first surface 72 of the head assembly 48 and portions of the top surfaces 76 of the ridges 64. Because the measurements of $H_1$ and $H_2$ are not taken at the same point along the x-axis, the magnitude of the surface flaws and resulting separation can be different for each measurement and can sometimes cause a measurement error of up to 1.0 nanometers. This can in turn cause a small error in the measurement of the depth H of the groove 60.

To minimize any such errors in the measured depth $H_m$, the optical measurements are generally taken as close to the edge between the groove 60 and the ridge 64 as possible. However, the center of the light beam from the light source 28 must be spaced from the edge by at least the radius of the beam to avoid having the beam reflected onto both the bottom surface 120 of the groove 60 and the top surface 76 of the ridge 64, a result which would prevent, the accurate measurement of $H_1$ or $H_2$. The diameter of the beam of light generated by the light source 28 is approximately 50 micrometers.

Generally, the surface flaws in the first surface 72 of the head assembly 48 and any resulting separations are small enough so that they can be ignored without significantly affecting the accuracy of the measurement of the depth H of the groove 60. However, if it is desired to compensate for the separation, the variations in the first surface 72 of the head assembly 48 can be mapped through the use of a profilometer. The results of this mapping are stored in a computer and can be used to create an adjustment value that can be either added to or subtracted from the measured values of $H_1$ and $H_2$. The bottom surface 120 of each groove 60 can also be mapped using a profilometer and the results stored and used in the same manner. The mapping of the first surface 72 of the head assembly 48 and the bottom surfaces 120 of the grooves 60 is generally done prior to the positioning of the head assembly 48 and the glass disc 44 in the calibration standard 40.

The load spring 52 can be designed to minimize any elastic deformation of the glass disc 44 or the head assembly 48 that might occur at the head assembly/disc interfaces. This is done by estimating the elastic deformation using the equation:

$$w_a = \frac{cP(1-v)^2}{E\sqrt{A}}$$

where $w_a$ is the average elastic deformation, P represents the contact load, v represents the Poisson ratio, E represents the Young's modulus, A represents the contact area and c is a numerical factor which depends on the length to width ratio of the contact area. By estimating the elastic deformation that occurs at each head assembly/disc interface, the amount of deformation can be controlled by selecting the appropriate load spring 52 and distance between the grooves 60.

The present invention has an advantage in that it is generally insensitive to particle contamination on the head assembly/disc interface. This is because two measurements are used to determine the depth H of a groove 60 and any change in distance of the first surface 72 of the head assembly 48 from the disc 44 will generally affect both of the measured distances $H_1$ and $H_2$ equally. The calibration standard 40 of the present invention also has the advantage of being relatively inexpensive in that it uses an ordinary head assembly.

While the calibration process was described as measuring the depth H of only one of the grooves 60, further pairs of optical measurements can be taken both measuring the depth H of the groove 60 already measured or measuring the depth H of other grooves 60. The measurement of the depth of additional grooves 60 helps to provide additional information points to improve the accuracy of the calibration over a wide range of flying heights.

Although the present invention has been described with reference to preferred embodiments, workers skilled in the art will recognize that changes may be made in form and detail without departing from the spirit and scope of the invention.

What is claimed is:

1. A calibration standard for calibrating a flying height tester that uses optical interference techniques to determine flying heights of head assemblies, the calibration standard comprising:

a head assembly including a read/write head, the head assembly having a first surface:

a transparent disc having a first surface and a second surface, wherein both the first surface and the second surface of the transparent disc face the first surface of the head assembly and wherein the second surface of the transparent disc is positioned on said transparent disc inward of said first surface to form a multilevel disc surface; and holding means for holding the head assembly such that the first surface of the head assembly contacts the first surface of the transparent disc to result in being spaced from the second surface of the transparent disc.

2. The calibration standard of claim 1 wherein the second surface of the transparent disc is substantially flat.

3. The calibration standard of claim 1 wherein the transparent disc has a third surface which contacts the first surface of the head assembly and is coplanar with the first surface of the transparent disc.

4. The calibration standard of claim 3 wherein the transparent disc has a fourth surface which faces and is spaced from the first surface of the head assembly in being positioned on the transparent disc inward of the first surface thereof.

5. The calibration standard of claim 1 and further comprising a cover having a first end in contact with the transparent disc, the cover and the transparent disc combining to form a head chamber in which is located the head assembly.

6. The calibration standard of claim 5 wherein the holding means includes a spring having a first end in contact with the head assembly and a second end in contact with an inner portion of the cover.

7. The calibration standard of claim 5 wherein the cover includes a desiccant chamber, in which is located a desiccant, the desiccant chamber being separated from the head chamber such that the desiccant is prevented from entering the head chamber but air flow is permitted between the two chambers.

8. The calibration standard of claim 1 wherein the head assembly used in the calibration standard is similar to head assemblies whose flying height is to be measured by the flying height tester.

9. A method of calibrating a flying height tester that uses optical interference techniques to determine flying heights of head assemblies, the method comprising the steps of:

inserting a calibration standard in the flying height tester, the calibration standard having a head assembly having a first surface and a transparent disc having a first surface facing and contacting the first surface of the head assembly and a second surface facing the first surface of the head assembly with this second surface positioned in the transparent disc inward of the first surface thereof to form a multilevel disc surface and spaced apart from the first surface of the head assembly;

determining an expected distance between the first surface of the transparent disc and the second surface of the transparent disc;

measuring an optically measured distance between the first surface of the transparent disc and the second surface of the transparent disc through optical interference techniques; and comparing the expected distance with the measured distance.

10. The method of claim 9 wherein the measured distance between the first and second surfaces of the transparent disc is measured by measuring a first measured distance between the first surface of the head assembly and the first surface of the transparent disc at a selected position on the first surface of the transparent disc and measuring a second measured distance between the second surface of the transparent disc and the first surface of the head assembly and subtracting the first measured distance from the second measured distance.

11. The method of claim 9 wherein the head assembly used in the calibration standard is similar to head assemblies whose flying height is to be measured by the flying height tester.

12. The method of claim 9 wherein the expected distance between the first and second surfaces of the transparent disc is determined through the use of a profilometer.

13. The method of claim 9 wherein the second surface of the transparent disc is substantially flat.

14. The method of claim 9 wherein the transparent disc has a third surface which contacts the first surface of the head assembly.

15. The method of claim 14 wherein the transparent disc has a fourth surface which faces and is spaced from the first surface of the head assembly in being positioned on the transparent disc inward of the first surface thereof.

16. The method of claim 9 wherein the calibration standard includes a cover having a first end in contact with the transparent disc, the cover and the transparent disc combining to form a head chamber in which is located the head assembly.

17. The method of claim 16 wherein the cover includes a desiccant chamber in which is located a desiccant, the desiccant chamber being separated from the head chamber such that the desiccant is prevented from entering the head chamber, but air flow is permitted between the two chambers.

18. A method of calibrating a flying height tester that uses optical interference techniques to determine flying heights of head assemblies, the method comprising the steps of:

inserting a calibration standard in the flying height tester, the calibration standard having a head assembly having a first surface and a transparent disc having a first surface facing and contacting the first surface of the head assembly and a second surface facing and spaced from the first surface of the head assembly;

measuring an optically measured distance between the first surface of the transparent disc and the second surface of the transparent disc through optical interference techniques; and calibrating the flying height tester as a function of the measured distance.

19. A calibration standard for calibrating a flying height tester that uses optical interference techniques to determine flying heights of head assemblies, the calibration standard comprising:

a head assembly including a read/write head;

a transparent disc having a first surface in which a groove is formed; and holding means for holding the head assembly in contact with the first surface of the transparent disc.

20. The calibration standard of claim 19 wherein the transparent disc has a plurality of additional grooves formed therein.

21. The calibration standard of claim 20 wherein each of the additional grooves has a different depth.

22. The calibration standard of claim 19 wherein the holding means includes a cover attached to the transparent disc to provide a sealed environment for an interface between the head assembly and the first surface of the transparent disc.

* * * * *

UNITED STATES PATENT AND TRADEMARK OFFICE
CERTIFICATE OF CORRECTION

PATENT NO. : 5,552,884

DATED : SEPTEMBER 3, 1996

INVENTOR(S) : YUFENG LI, PETER R. GOGLIA

It is certified that error appears in the above-indentified patent and that said Letters Patent is hereby corrected as shown below:

Col. 2, line 14, delete "theta", insert --then--

Col. 4, line 45, delete "It", insert --H--

Col. 5, line 3, delete "theta", insert --then--

Col. 6, line 9, delete "$_{and}$", insert --and--

Col. 6, line 51, after "prevent", delete ","

Col. 7, line 48, after "surface", delete ":', insert --;--

Signed and Sealed this

Seventeenth Day of December, 1996

Attest:

BRUCE LEHMAN

*Attesting Officer*      *Commissioner of Patents and Trademarks*